United States Patent [19]

Yachigo et al.

[11] Patent Number: 5,281,646

[45] Date of Patent: Jan. 25, 1994

[54] PRODUCTION OF THERMOPLASTIC RESIN HAVING HIGH IMPACT RESISTANCE

[75] Inventors: Shinichi Yachigo, Toyonaka; Kanako Ida, Ashiya; Hiroshi Kojima, Niihama, all of Japan

[73] Assignee: Sumitomo Chemical Company, Limited and Sumitomo Dow Limited, Osaka, Japan

[21] Appl. No.: 947,560

[22] Filed: Sep. 21, 1992

[30] Foreign Application Priority Data

Sep. 24, 1991 [JP] Japan .................... 3-243166

[51] Int. Cl.$^5$ .............. C08K 5/10; C08L 51/04; C08F 279/04
[52] U.S. Cl. .................... 524/291; 525/303; 525/316
[58] Field of Search ............... 524/291; 525/303, 316

[56] References Cited

U.S. PATENT DOCUMENTS 4,525,514  6/1985  Yachigo et al. .
5,047,461 10/1991  Takata et al. ................ 524/291
5,128,398  7/1992  Sasaki et al. .

FOREIGN PATENT DOCUMENTS 56-131656 10/1981 Japan .

OTHER PUBLICATIONS

Chemical Abstracts, vol. 107, No. 12, Sep. 21, 1987, Columbus, Ohio USA, K. Motomatsu et al., "Low-temperature impact-resistant resin composition with improved heat resistance and pigment dyeability", p. 38, col. 1, abstract No. 97 658y & JP-A-61-258 856.
Chemical Abstracts, vol. 107, No. 4, Jul. 27, 1987, Columbus, Ohio, USA. K. Motomatsu et al., "Resin compositions with improved heat resistance and pigment dyeability", p. 65, column 1, abstract No. 24 613f & JP-A-61-241 347.
Chemical Abstracts, vol. 107, No. 10, Sep. 7, 1987, Columbus, Ohio, USA, K. Motomatsu et al., "Impact-resistant resin compositions with improved heat resistance and pigment dyeability", p. 44, col. 2, abstract No. 78 902t & JP-A-61-246 243.
Chemical Abstracts, vol. 108, No. 6, Feb. 8, 1988, Columbus, Ohio USA, T. Namitsuka et al., "Diene rubber compositions for high-impact polystyrene", p. 46, col. 2, abstract No. 39 070w & JP-A-62-153 329.

Primary Examiner—Vasu S. Jagannathan
Attorney, Agent, or Firm—Stevens, Davis, Miller & Mosher

[57] ABSTRACT

In a process for producing a thermoplastic resin by emulsion polymerization using a conjugated diene rubber, an aromatic vinyl compound and a vinyl cyanide compound, and by successive flocculation and direct pelletizing, the direct pelletizing is effected in the presence of a phenolic compound represented by

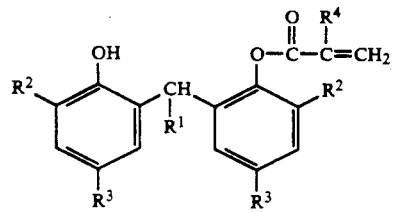

wherein $R^1$ and $R^4$ are each hydrogen or methyl, and $R^2$ and $R^3$ are each an alkyl of 1 to 9 carbon atoms. The use of the phenolic compound is effective to prevent the resin from thermal deterioration during the direct pelletizing, thereby producing the thermoplastic resin excellent in properties such as impact resistance.

20 Claims, No Drawings

PRODUCTION OF THERMOPLASTIC RESIN HAVING HIGH IMPACT RESISTANCE

BACKGROUND OF THE INVENTION

1. Field of the Invention

The present invention relates to a process for producing a thermoplastic resin by means of emulsion polymerization using a conjugated diene rubber, an aromatic vinyl compound and a vinyl cyanide compound, followed by flocculation and subsequent direct pelletizing. More particularly, the invention relates to a process for producing a thermoplastic resin having improved impact resistance by adopting the direct pelletizing to omit a drying step which causes oxidation deterioration of the resin, and further by effecting the direct pelletizing in the presence of a particular phenolic compound to prevent the resin from thermal deterioration in the absence of oxygen.

2. Description of Related Art

In general, ABS resins are known to be graft polymers prepared by polymerizing an aromatic vinyl compound and a vinyl cyanide compound in the presence of a conjugated diene rubber or to be the mixtures of such graft polymer further blended with a copolymer of an aromatic vinyl compound and a vinyl cyanide compound. Because they have excellent properties in processability, mechanical strength, gloss, chemical resistance and so forth, they are widely used in many fields today. In recent years, for the purpose of imparting heat resistance to the resins, there have been some attempts for improvements such that a part of the aromatic vinyl compound is replaced with an unsaturated carboxylic acid alkyl ester compound or an imide compound.

The graft polymers are known to be produced by emulsion polymerization, bulk polymerization, suspension polymerization, solution polymerization or the like, but the emulsion polymerization is widely adopted because of its contribution to the properties of the resin such as gloss and impact strength of the products, its safety in the process and so forth. The graft polymers obtained by the emulsion polymerization is, if necessary after being mixed with a copolymer of an aromatic vinyl compound and a vinyl cyanide compound, usually subjected to the steps of flocculation, solid-liquid separation and hot air drying to make powdery products.

However, this process has a problem in that the impact resistance which is characteristic of the ABS resins is not sufficiently revealed. This is because the graft polymers or the optionally added copolymers undergo oxidation deterioration during the hot air drying. In order to stabilize the resins during the hot air drying, there have been heretofore been applied such methods as incorporating a phenolic antioxidant of various kinds, or incorporating one or more other antioxidants including sulfur-containing antioxidants, phosphorus-containing antioxidants and amine antioxidants in addition to the phenolic antioxidant.

For example, the phenolic antioxidants conventionally applied are n-octadecyl 3-(3,5-di-t-butyl-4-hydroxyphenyl)propionate, 4,4'-butylidenebis(3-methyl-6-t-butylphenol), 4,4'-thiobis(3-methyl-6-t-butylphenol), 2,2'-methylenebis(4-methyl-6-t-butylphenol), a formalin condensation product of nonylated para-cresol, 2,6-di-t-butyl-4-methylphenyl and the like. The sulfur-containing antioxidants conventionally applied are pentaerythrityl tetrakis(3-laurylthiopropionate), dilauryl 3,3'-thiodipropionate, dimyristyl 3,3'-thiodipropionate, distearyl 3,3'-thiodipropionate, lauryl stearyl 3,3'-thiodipropionate and the like. The phosphorus-containing antioxidants conventionally applied are tris(nonylphenyl) phosphite and the like.

Although the application of such antioxidants considerably improves the stability of the resins during the hot air drying, it has still some problems in that the ABS resins after drying become discolored, and further in that the resins is not necessarily satisfactory for producing shaped articles of high impact resistance. As a method for resolving such problems, there has been proposed a direct pelletizing process which is conducted after flocculation by eliminating the hot air drying step which causes severe oxidation deterioration to the resin. However, since the aforementioned phenolic antioxidants, phosphorus-containing antioxidants, sulfur-containing antioxidants, amine antioxidants or the like are scarcely effective to the thermal deterioration which occurs in the absence of oxygen during the direct pelletizing, for example, inside an extruder, the direct pelletizing still has a problem in that it hardly controls the failure of the impact resistance.

SUMMARY OF THE INVENTION

The present inventors have made intensive research about a process for producing a thermoplastic resin by the direct pelletizing after flocculation without going through the drying step to develop a new process accompanying no or little reduction of the impact resistance which is a characteristic of the ABS resins, and resultantly have achieved the present invention.

Thus, the present invention provides a process for producing a thermoplastic resin by conducting emulsion polymerization using a conjugated diene rubber, an aromatic vinyl compound and a vinyl cyanide compound, followed by flocculation and direct pelletizing, in which the direct pelletizing is effected in the presence of a phenolic compound represented by the following formula (I):

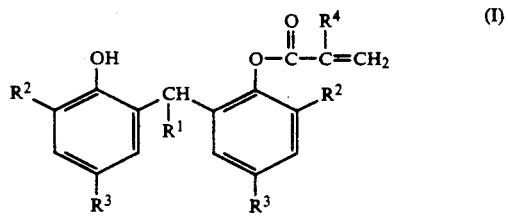

wherein $R^1$ is hydrogen or methyl, $R^2$ and $R^3$ independently of one another are each an alkyl of 1 to 9 carbon atoms, and $R^4$ is hydrogen or methyl, thereby producing the thermoplastic resin having high impact resistance.

The present invention also provides a thermoplastic resin produced by the above-mentioned process.

DESCRIPTION OF THE PREFERRED EMBODIMENTS

The present invention will be explained in detail hereunder.

In the phenolic compound represented by the above formula (I) to be used in the invention, $R^2$ is an alkyl of 1 to 9 carbon atoms, preferably an alkyl of 4 to 8 carbon atoms, and more preferably an alkyl bonding to the benzene ring through a quaternary carbon atom, including t-butyl, t-amyl and t-octyl, $R^3$ in the formula (I) is an alkyl of 1 to 9 carbon atoms, preferably an alkyl of 1 to 6 carbon atoms, and especially preferred is methyl, ethyl, t-butyl or t-amyl.

Preferred examples of the compound represented by the formula (I) are as follows:
2-t-butyl-6-(3-t-butyl-2-hydroxy-5-methylbenzyl)-4-methylphenyl acrylate,
2,4-di-t-butyl-6-[1-(3,5-di-t-butyl-2-hydroxyphenyl)ethyl]phenyl acrylate,
2,4-di-t-amyl-6-[1-(3,5-t-amyl-2-hydroxyphenyl)ethyl]phenyl acrylate,
2-t-butyl-6-(3-t-butyl-2-hydroxy-5-methylbenzyl)-4-methylphenyl methacrylate, and
2,4-di-t-amyl-6-[1-(3,5-di-t-amyl-2-hydroxyphenyl)ethyl]phenyl methacrylate.

Polymerization in the invention is effected by using a conjugated diene rubber, an aromatic vinyl compound and a vinyl cyanide compound. The conjugated diene rubber to be used herein can be polybutadiene rubber, styrene-butadiene copolymer rubber, acrylonitrile-butadiene copolymer rubber and the like. The aromatic vinyl compound can be styrene, a nuclear substituted alkyl styrene such as p-methylstyrene or p-t-butylstyrene, α-methylstyrene and the like. The vinyl cyanide compound can be acrylonitrile, methacrylonitrile, α-chloroacrylonitrile and the like.

It is possible to replace a part of the aromatic vinyl compound with another copolymerizable compound such as an unsaturated carboxylic acid alkyl ester compound or an imide compound. The unsaturated carboxylic acid alkyl ester compound includes, for example, methyl acrylate, ethyl acrylate, methyl methacrylate, glycidyl methacrylate, and the like. The imide compound includes, for example, maleimide, N-phenylmaleimide and the like.

There is no particular limitation for a formulation ratio of the each component to be used in the polymerization, but preferably the conjugated diene rubber is in a range of 10 to 80% by weight, and total of all monomers is in a range of 90 to 20% by weight, each based on the total weight of all reactants. A formulation ratio of the monomers is also not particularly limited, but the aromatic vinyl compound is preferably in a range of 50 to 80% by weight, and the vinyl cyanide compound is preferably in a range of 50 to 20% by weight, each based on the weight of all monomers.

The thermoplastic resin referred to in the invention is either a graft polymer prepared by emulsion polymerization of the aromatic vinyl compound and the vinyl cyanide compound in the presence of the conjugated diene rubber, or a mixture comprising the graft polymer and a copolymer prepared by emulsion polymerization of the aromatic vinyl compound and the vinyl cyanide compound. The emulsion polymerization itself can be effected in a known manner, for example, by using a usual emulsifier, a usual initiator and a usual molecular weight controller.

The graft polymer obtained in the invention is not particularly limited in its particle size, but preferred particle size is usually in a range of from about 0.1 to about 1 $\mu$.

The thermoplastic resin obtained by the emulsion polymerization is then subjected to a flocculation step. This is a treatment for precipitating a polymer which is in a state of latex, and it is usually carried out by adding a flocculant such as an acid or a salt. The flocculant to be used for the flocculation can be a known compound including, for example, salts such as sodium chloride, calcium chloride and magnesium sulfate, and acids such as hydrochloric acid and sulfuric acid.

By the flocculation treatment, the thermoplastic resin gets a slurry state. In the invention, the direct pelletizing is effected with the slurry state or a moist state after solid-liquid separation such as filtration. Thus, the direct pelletizing means that the resin after flocculation is subjected to a pelletizing treatment without effecting hot air drying. For example, it includes a method in which a liquid slurry without filtration or a moist solid after filtration is supplied to an extruder in which a dehydrating zone and a heating/melting zone are placed side by side to effect the pelletizing. The direct pelletizing is usually carried out at a temperature of from about 200° to about 350° C.

In the invention, the direct pelletizing is effected in the presence of a phenolic compound represented by the above formula (I). In other words, it is enough that the compound of the formula (I) is present in a stage of the direct pelletizing, and hence, the compound of the formula (I) can be added to the system before the final stage of the pelletizing step. Therefore, timing of its addition is not particularly limited, as far as it is added before the final stage of the pelletizing step. For example, the phenolic compound can be added after terminating the polymerization step, during the flocculation step, after terminating the flocculation step, in the initial stage of the pelletizing step (a dehydrating zone), or in the latter stage of the pelletizing step (a melting zone). Preferably, the compound of the formula (I) is added during the flocculation step, after terminating the flocculation step and before going to the pelletizing step, or in a dehydrating zone of the pelletizing step.

The compound represented by the formula (I) is applied, according to the invention, preferably in a range of 0.01 to 5 parts by weight, more preferably in a range of 0.05 to 2 parts by weight, per 100 parts by weight of the thermoplastic resin. Its amount less than 0.01 part by weight is not sufficient for the improving effect in the impact strength, and its amount exceeding 5 parts by weight hardly contributes to the improving effects corresponding to the increased amount and is therefore disadvantageous from the economical viewpoint.

In the invention, any other additives may be further incorporated into the resin if necessary. Such other additives include, for example, other phenolic antioxidants, sulfur-containing antioxidants, phosphorus-containing antioxidants, ultraviolet absorbers, hindered amine light stabilizers, lubricants, pigments, dyestuffs, flame retardants, foaming agents, reinforcing agents, inorganic fillers and others. They can be added simultaneously with the compound represented by the formula (I), and otherwise can be added separately in an optional stage until terminating the direct pelletizing. They may be alternatively incorporated into the resin in an optional stage of processing after the pelletizing depending on the circumstances. Specific examples of these optionally usable additives are illustrated below.

The phenolic antioxidants other than the compound of the formula (I) include, for example, the following:
4,4'-buthylidenebis(3-methyl-6-t-butylphenol),
2,2'-methylenebis(4-methyl-6-t-butylphenol),
4,4'-thiobis(3-methyl-6-t-butylphenol),
n-octadecyl 3-(3,5-di-t-butyl-4-hydroxyphenyl)propionate,
triethylene glycol bis[3-(3-t-butyl-4-hydroxymethylphenyl)propionate], 3,9-bis[2-{3-(3-t-butyl-4-hydroxy-5-methylphenyl)propionyloxy}-1,1-dimethylethyl]-2,4,8,10-tetraoxaspiro[5.5]undecane,
2,2'-ethylidenebis(4,6-di-t-butylphenol),
tris(3,5-di-t-butyl-4-hydroxybenzyl) isocyanurate, a formalin condensation product of nonylated para-cresol, and
2,6-di-t-butyl-4-methylphenol.

The sulfur-containing antioxidants include, for example, the following:
pentaerythrityl tetrakis(3-laurylthiopropionate),
dilauryl 3,3'-thiodipropionate,
dimyristyl 3,3'-thiodipropionate,
distearyl 3,3'-thiodipropionate, and
lauryl stearyl 3,3'-thiodipropionate.

The phosphorus-containing antioxidants include, for example, the following:
tris(nonylphenyl) phosphite,
distearyl pentaerythritol diphosphite,
tris(2,4-di-t-butylphenyl) phosphite,
tetratridecyl 4,4'-butylidenebis(3-methyl-6-t-butylphenyl) diphosphite,
bis(2,4-di-t-butylphenyl) pentaerythritol diphosphite,
tetrakis(2,4-di-t-butylphenyl) 4,4'-biphenylene diphosphonite,
bis(2,6-di-t-butyl-4-methylphenyl) pentaerythritol diphosphite,
2,2'-methylenebis(4,6-di-t-butylphenyl) octyl phosphite,
2,2'-ethylidenebis(4,6-di-t-butylphenyl) fluorophosphonite, and
bis(2,4,6-tri-t-butylphenyl) pentaerythritol diphosphite.

The ultraviolet absorbers include, for example, the following:
2-hydroxy-4-methoxybenzophenone,
2-hydroxy-4-octyloxybenzophenone,
2,2'-dihydroxy-4-methoxybenzophenone,
bis(5-benzoyl-4-hydroxy-2-methoxyphenyl)methane
2,2',4,4'-tetrahydroxybenzophenone,
2-(2-hydroxy-5-methylphenyl)benzotriazole,
2-[2-hydroxy-3-(3,4,5,6-tetrahydrophthalimidomethyl)-5-methylphenyl]benzotriazole,
2-(3-t-butyl-2-hydroxy-5-methylphenyl)-5-chlorobenzotriazole,
2-(3,5-di-t-butyl-2-hydroxyphenyl)benzotriazole,
2-(2-hydroxy-5-t-octylphenyl)benzotriazole,
2-(3,5-di-t-amyl-2-hydroxyphenyl)benzotriazole,
2-[2-hydroxy-3,5-bis(α,α-dimethylbenzyl)phenyl]-2H-benzotriazole,
2-(3,5-di-t-butyl-2-hydroxyphenyl)-5-chlorobenzotriazole,
2,2'-methylenebis[6-(2H-benzotriazol-2-yl)-4-(1,1,3,3-tetramethylbutyl)phenol],
a condensation product of poly(3-11)(ethylene glycol) with methyl 3-[3-(2H-benzotriazol-2-yl)-5-t-butyl-4-hydroxyphenyl]propionate,
2-ethylhexyl 3-[3-t-butyl-5-{5-chloro-2H-benzotriazol-2-yl)-4-hydroxyphenyl]propionate,
octyl 3-[3-t-butyl-5-(5-chloro-2H-benzotriazol-2-yl)-4-hydroxyphenyl]propionate,
methyl 3-[3-t-butyl-5-(5-chloro-2H-benzotriazol-2-yl)-4-hydroxyphenyl]propionate,
3-[3-t-butyl-5-(5-chloro-2H-benzotriazol-2-yl)-hydroxyphenyl]propionic acid, and
2,2'-methylenebis[4-t-butyl-6-(2H-benzotriazol-yl)phenol].

The hindered amine light stabilizers include, for example, the following:
bis(2,2,6,6-tetramethyl-4-piperidyl) sebacate,
a polycondensation product of dimethyl succinate with 1-(2-hydroxyethyl)-4-hydroxy-2,2,6,6-tetramethylpiperidine,
poly[(6-morpholino-1,3,5-triazin-2,4-diyl)-{(2,2,6,6-tetramethyl-4-piperidyl)imino}hexamethylene-{(2,2,6,6-tetramethyl-4-piperidyl)imino}],
bis(1,2,2,6,6-pentamethyl-4-piperidyl) 2-(3,5-di-t-butyl-4-hydroxybenzyl)-2-butylmalonate,
4-[3-(3,5-di-t-butyl-4-hydroxyphenyl)propionyloxyl]-1-[2-{3-(3,5-di-t-butyl-4-hydroxyphenyl)propionyloxy}ethyl]-2,2,6,6-tetramethylpiperidine,
bis(1,2,2,6,6-pentamethyl-4-piperidyl) decanedioate,
tetrakis(2,2,6,6-tetramethyl-4-piperidyl) 1,2,3,4-butanetetracarboxylate,
poly[{6-(1,1,3,3-tetramethylbutyl)imino-1,3,5-triazin-2,4-diyl}[(2,2,6,6-tetramethyl-4-piperidyl)imino]hexamethylene{(2,2,6,6-tetramethyl4--piperidyl)imino}],
a mixed ester of 1,2,3,4-butanetetracarboxylic acid with 1,2,2,6,6-pentamethyl-4-piperidinol and 1-tridecanol,
a mixed ester of 1,2,3,4-butanetetracarboxylic acid with 2,2,6,6-tetramethyl-4-piperidinol and 1-tridecanol,
a mixed ester of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane,
a mixed ester of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane,
a polycondensation product of N,N'-bis-(2,2,6,6-tetramethyl-4-piperidyl)hexamethylenediamine with 1,2-dibromoethane,
2-methyl-2-(2,2,6,6-tetramethyl-4-piperidyl)amino-N-(2,2,6,6-tetramethyl-4-piperidyl)propionamide,
N,N',4,7-tetrakis[4,6-bis{N-butyl-N-(2,2,6,6-tetramethyl-4-piperidyl)amino]-1,3,5-triazin-2-yl]-4,7-diazadecane-1,10-diamine,
N,N',4-tris[4,6-bis{N-butyl-N-(2,2,6,6-tetramethyl-4-piperidyl)amino}-1,3,5-triazin-2-yl]-4,7-diazadecane-1,10-diamine,
bis(1-acryloyl-2,2,6,6-tetramethyl-4-piperidyl) 2,2-bis(3,5-di-t-butyl-4-hydroxybenzyl)-malonate,
N,N',4,7-tetrakis[4,6-bis{N-butyl-N-1,2,2,6,6-pentamethyl-4-piperidyl)amino}-1,3,5-triazin-2-yl]-4,7-diazadecane-1,10-diamine,
N,N',4-tris[4,6-bis{N-butyl-N-(1,2,2,6,6-pentamethyl-4-piperidyl)amino}-1,3,5-triazin-2-yl]-4,7-diazadecane-1,10-diamine,
bis(2,2,6,6-tetramethyl-4-piperidyl) succinate,
2,2,6,6-tetramethyl-4-piperidyl methacrylate,
1,2,2,6,6-pentamethyl-4-piperidyl methacrylate, and
tetrakis(1,2,2,6,6-pentamethyl-4-piperidyl) 1,2,3,4-butanetetracarboxylate.

The thermoplastic resin obtained in accordance with the invention is also possible to be blended with another polymer, if necessary. Other polymers usable for the blend include, for example, styrene-acrylonitrile copolymer, polycarbonate, polyamide, polyphenylene ether, polyester, poly(vinyl chloride) and the like.

Next, the invention will be explained in more detail with reference to examples, which are only illustrative for the preferred embodiments, but not limitative to the scope of the invention. In the examples, given percentages and parts are by weight unless otherwise indicated.

Test stabilizers used in the examples are as follows, and they will be referred to hereunder by the indicated letters.

I-1: 2,4-Di-t-amyl-6-[1-(3,5-di-t-amyl-2-hydroxyphenyl-)ethyl]phenyl acrylate
I-2: 2-t-Butyl-6-(3-t-butyl-2-hydroxy-5-methylbenzyl)-4-methylphenyl acrylate
AO-1: n-Octadecyl 3-(3,5-di-t-butyl-4-hydroxyphenyl)-propionate
AO-2: 4,4'-Butylidenebis(3-methyl-6-t-butylphenol)
SAO: Dilauryl 3,3'-thiodipropionate
PAO: Tris(nonylphenyl) phosphite

EXAMPLE 1

A nitrogen-atmosphered reactor was charged with 20 parts (as solids) of a polybutadiene latex, 200 parts of water, 0.1 part of ethylenediaminetetraacetic acid disodium salt, 0.001 part of ferric sulfate and 0.4 part of sodium formaldehydesulfoxylate, and after heating the contents to 60° C., a mixture comprising 25 parts of acrylonitrile, 55 parts of styrene, 0.5 part of t-dodecylmercaptan and 0.2 part of cumene hydroperoxide was added thereto continuously over 3 hours, followed by polymerization for further 2 hours at 60° C. to obtain a latex polymer. This latex polymer was flocculated by adding calcium chloride, and the resulting slurry was supplied to an extruder of 30 mm caliber having a vent to be pelletized at 260° C. In this procedure, any of the stabilizers shown in Table 1 was mixed with the polymer at a dehydrating zone of the extruder.

The pellets thus obtained were shaped by an injection molding machine of 5.5 ounces at 240° C. and 280° C. to prepare respective specimens of 63.5 mm×12.5 mm×6.4 mm. These specimens having a notch on the surface of 6.4 mm width were subjected to an Izod impact test in accordance with JIS K 7110-1977. The izod impact values determined are shown in Table 1.

TABLE 1

|  |  | Invention | Comparison |
|---|---|---|---|
| Test stabilizer (part) | I-1 | 0.4 | |
|  | AO-2 | | 0.4 |
| Izod impact value (kgf-cm/cm) | Shaped at 240° C. | 27.5 | 26.1 |
|  | Shaped at 280° C. | 24.9 | 18.3 |

EXAMPLE 2

A nitrogen-atmosphered reactor was charged with 60 parts (as solids) of a polybutadiene latex, 200 parts of water, 0.1 part of ethylenediaminetetraacetic acid disodium salt, 0.001 part of ferric sulfate and 0.4 part of sodium formaldehydesulfoxylate, and after heating the contents to 60° C., a mixture comprising 13 parts of acrylonitrile, 27 parts of styrene and 0.2 part of cumene hydroperoxide was added thereto continuously over 3 hours, followed by polymerization for further 2 hours at 60° C. to obtain a latex graft polymer.

Separately, a nitrogen-atmosphered reactor was charged with 120 parts of water and 0.3 part of potassium persulfate, and after heating the contents to 65° C., a mixture comprising 70 parts of styrene, 30 parts of acrylonitrile, 0.3 part of t-dodecylmercaptan and 1.5 parts of an aqueous 10% potassium oleate solution was added thereto continuously over 4 hours, followed by polymerization for further 2 hours at 65° C. to obtain a styrene-acrylonitrile copolymer.

The latex graft polymer formerly obtained and the copolymer later obtained were admixed to be a rubber content of 15%, and the mixture was flocculated by adding calcium chloride. Thereafter, the same procedure as in Example 1 was repeated to directly pelletize the slurry without hot air drying and to evaluate an Izod impact value after shaping. Amounts of the test stabilizers added were shown in Table 2 and Table 3 as part per 100 parts of total amount of the graft polymer and the copolymer. The timing to add the test stabilizers is as follows, and it is indicated in Table 2 and Table 3 with the respective letters in parentheses below the amount of the test stabilizer.

A: admixed with the polymer of a latex state before the flocculation
B: admixed with the polymer of a slurry state after the flocculation
C: admixed with the polymer at a dehydrating zone of the pelletizing step in the extruder
D: admixed with the polymer at a melting zone of the pelletizing step in the extruder The amounts and addition timing of the test stabilizers and the results of the Izod impact test are shown in Table 2 and Table 3.

TABLE 2

| | | Runs of the invention in Example 2 | | | | | | | | | | |
|---|---|---|---|---|---|---|---|---|---|---|---|---|
| Run No. | | 1 | 2 | 3 | 4 | 5 | 6 | 7 | 8 | 9 | 10 | 11 |
| Test additive (part) and Timing of addition (in parenthesis) | I-1 | 0.2 (A) | | 0.4 (C) | 0.2 (C) | 0.2 (C) | 0.2 (C) | 0.2 (C) | 0.2 (C) | 0.2 (C) | 0.2 (C) | 0.2 (C) |
| | I-2 | | 0.2 (B) | | | | | | | | | 0.05 (C) |
| | AO-1 | | | | 0.2 (A) | | | | 0.1 (B) | 0.1 (A) | | |
| | AO-2 | | | | | 0.2 (C) | | | | | | |
| | SAO | | | | | | 0.2 (C) | | | 0.1 (A) | 0.1 (C) | 0.075 (C) |
| | PAO | | | | | | | 0.2 (C) | 0.1 (D) | | 0.1 (D) | 0.075 (C) |
| Izod impact value (kgf-cm/cm) | Shaped at 240° C. | 19.5 | 19.6 | 20.5 | 19.3 | 19.6 | 20.0 | 19.9 | 19.7 | 19.5 | 19.8 | 19.9 |
| | Shaped at 280° C. | 17.3 | 17.6 | 18.1 | 17.5 | 17.5 | 17.8 | 17.5 | 17.7 | 17.2 | 17.8 | 17.7 |

TABLE 3

| Run No. | | 12 | 13 | 14 | 15 | 16 | 17 | 18 |
|---|---|---|---|---|---|---|---|---|
| Test additive (part) and Timing of | I-1 | | | | | | | None |
| | I-2 | | | | | | | |
| | AO-1 | 0.4 (A) | | 0.2 (C) | 0.2 (A) | 0.2 (B) | 0.2 (C) | |
| | AO-2 | | 0.4 (B) | 0.2 (C) | | | | |
| | SAO | | | | 0.2 | 0.2 | 0.1 | |

TABLE 3-continued

| Run No. | | 12 | 13 | 14 | 15 | 16 | 17 | 18 |
|---|---|---|---|---|---|---|---|---|
| addition (in parenthesis) | PAO | | | | (A) | (D) | (C) 0.1 (C) | |
| Izod impact value (kgf-cm/cm) | Shaped at 240° C. | 18.2 | 18.1 | 18.1 | 17.8 | 17.9 | 17.8 | 17.2 |
| | Shaped at 280° C. | 14.4 | 12.9 | 13.5 | 13.3 | 13.0 | 13.1 | 12.5 |

EXAMPLE 3

A nitrogen-atmosphered reactor was charged with 120 parts of water, 0.3 part of potassium persulfate, 1.5 parts of potassium oleate, 21 parts of α-methylstyrene, 9 parts of acrylonitrile and 0.12 part of t-dodecylmercaptan, and the contents were heated to 70° C. After effecting polymerization for 1 hour, a mixture comprising 49 parts of α-methylstyrene, 21 parts of acrylonitrile and 0.28 part of t-dodecylmercaptan was added thereto continuously over 3 hours, while keeping the inner temperature of the reaction system at 70° C., and the polymerization was continued for further 2 hours at 70° C., thereby completing the polymerization.

The latex copolymer thus obtained was admixed with the latex graft polymer applied in Example 2 to obtain a latex mixture containing 15% of rubber components. The mixture was flocculated by adding calcium chloride, and subjected to centrifugal separation to make it a hydrated state having a water content of 50%. The hydrated mixture was blended with any stabilizer shown in Table 4 and pelletized, followed by evaluation in the same manner as in Example 1. Amounts of the test stabilizers added and the evaluation results are shown in Table 4, in which the amount is given as part per 100 parts of the total amount of the graft polymer and the copolymer.

TABLE 4

| | | Invention | Comparison |
|---|---|---|---|
| Test stabilizer (part) | I-1 | 0.3 | |
| | AO-2 | | 0.3 |
| Izod impact value (kgf-cm/cm) | Shaped at 240° C. | 16.4 | 15.6 |
| | Shaped at 280° C. | 15.3 | 11.2 |

EXAMPLE 4

A nitrogen-atmosphered reactor was charged with 150 parts of water and 1 part of sodium dodecylbenzenesulfonate, and after heating the contents to 70° C., a mixture comprising 25 parts of N-phenylmaleimide, 20 parts of acrylonitrile, 55 parts of styrene and 0.15 part of t-dodecylmercaptan was added thereto continuously over 5 hours. The contents were further heated to 75° C., and polymerization was continued for 2 hours, thereby completing the polymerization.

The latex copolymer thus obtained was admixed with the latex graft polymer applied in Example 2 to obtain a latex mixture containing 15% of rubber components. The mixture was flocculated by adding calcium chloride, and then blended with any stabilizer shown in Table 5 followed by pelletizing and evaluation in the same manner as in Example 1. Amounts of the test stabilizers added and the evaluation results are shown in Table 5, in which the amount of the stabilizer is given as part per 100 parts of the total amount of the graft polymer and the copolymer.

TABLE 5

| | | Invention | Comparison |
|---|---|---|---|
| Test stabilizer (part) | I-1 | 0.3 | |
| | AO-2 | | 0.3 |
| Izod impact value (kgf-cm/cm) | Shaped at 240° C. | 13.5 | 12.8 |
| | Shaped at 280° C. | 12.7 | 9.3 |

The process of the present invention, which is applied in the production of a thermoplastic resin from a conjugated diene rubber, an aromatic vinyl compound and a vinyl cyanide compound, is possible to omit a hot air drying step and also to control the deterioration of the resin during direct pelletizing, thereby producing a thermoplastic resin excellent in properties including impact resistance, gloss and the like.

What is claimed is:

1. A process for producing a thermoplastic resin of high impact resistance which comprises:
   (A) conducting emulsion polymerization of an aromatic vinyl compound and a vinyl cyanide compound in the presence of a conjugated diene rubber to obtain an emulsion containing a graft polymer;
   (B) flocculating the emulsion containing a graft polymer to obtain a slurry; and
   (C) subjecting the slurry without drying to a pelletizing treatment carried out in the presence of a phenolic compound represented by the formula:

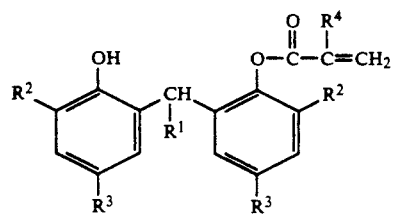

wherein $R^1$ is hydrogen or methyl, $R^2$ and $R^3$ independently of one another are each an alkyl of 1 to 9 carbon atoms, and $R^4$ is hydrogen or methyl, thereby producing the thermoplastic resin having high impact resistance.

2. The process of claim 1, wherein $R^2$ is t-butyl, t-amyl or t-octyl.

3. The process of claim 1, wherein $R^3$ is methyl, ethyl, t-butyl, or t-amyl.

4. The process of claim 1, wherein the phenolic compound is selected from the group consisting of 2-t-butyl-6-(3-t-butyl-2-hydroxy-5-methylbenzyl)-4-methylphenyl acrylate, 2,4-di-t-butyl-6-[1-(3,5-di-t-butyl-2-hydroxyphenyl)ethyl]phenyl acrylate, 2,4-di-t-amyl-6-[1-(3,5-di-t-amyl-2-hydroxyphenyl)ethyl]phenyl acrylate, 2-t-butyl-6-(3-t-butyl-2-hydroxy-5-methylbenzyl)-4-methylphenyl methacrylate, and 2,4-di-t-amyl-6-[1-(3,5-di-t-amyl-2-hydroxyphenyl)ethyl]phenyl methacrylate.

5. The process of claim 1, wherein the conjugated diene rubber is selected from the group consisting of polybutadiene rubber, styrene-butadiene copolymer rubber and acrylonitrile-butadiene copolymer rubber.

6. The process of claim 1, wherein the aromatic vinyl compound is selected from the group consisting of styrene, styrenes of which nucleus is substituted with at least one alkyl, and α-methylstyrene.

7. The process of claim 1, wherein the vinyl cyanide compound is selected from the group consisting of acrylonitrile, methacrylonitrile and α-chloroacrylonitrile.

8. The process of claim 1, wherein the step (A) includes the step of replacing a part of the aromatic vinyl compound by a copolymerizable compound selected from the group consisting of an unsaturated carboxylic acid alkyl ester compound and an imide compound.

9. The process of claim 1, wherein the step (A) includes the step of selecting the weight ratio of the conjugated diene rubber to the sum of the aromatic vinyl compound and the vinyl cyanide compound within the range of from 10:90 to 80:20.

10. The process of claim 8, wherein the step (A) includes the step of selecting the weight ratio of the conjugated diene rubber to the sum of the aromatic vinyl compound, the vinyl cyanide compound and the copolymerizable compound within the range of from 10:90 to 80:20.

11. The process of claim 1, wherein the step (A) includes the step of mixing the emulsion containing a graft copolymer with a copolymer obtained by emulsion polymerization of an aromatic vinyl compound and a vinyl cyanide compound.

12. The process of claim 1, wherein the step (B) includes the step of adding a flocculant into the emulsion.

13. The process of claim 12, wherein the flocculant is a salt selected from the group consisting of sodium chloride, calcium chloride and magnesium sulfate, or an acid selected from the group consisting of hydrochloric acid and sulfuric acid.

14. The process of claim 1, wherein the step (C) includes a step selected from the group consisting of:
(C1) supplying the slurry to an extruder in which a dehydrating zone and a heating/melting zone are placed side by side, and
(C2) subjecting the slurry to solid-liquid separation to obtain a moist solid and supplying the moist solid to an extruder in which a dehydrating zone and a heating/melting zone are placed side by side.

15. The process of claim 1, wherein the pelletizing treatment is effected at a temperature between 200° and 350° C.

16. The process of claim 1, wherein the phenolic compound is added during the step (B) or between the steps (B) and (C).

17. The process of claim 14, wherein the phenolic compound is added into the dehydrating zone of the extruder.

18. The process of claim 1, wherein the step (C) includes the step of selecting the amount added of the phenolic compound so that 0.01 to 5 parts by weight of the phenolic compound is contained in 100 parts by weight of the thermoplastic resin.

19. A thermoplastic resin produced by the process of claim 1.

20. In a process for producing a thermoplastic resin by conducting emulsion polymerization using a conjugated diene rubber, an aromatic vinyl compound and a vinyl cyanide compound to obtain a graft polymer, followed by flocculation and direct pelletizing, an improvement wherein the direct pelletizing is effected in the presence of a phenolic compound represented by the following formula:

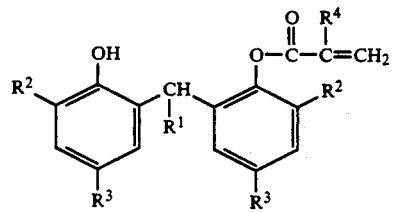

wherein $R^1$ is hydrogen or methyl, $R^2$ and $R^3$ independently of one another are each an alkyl of 1 to 9 carbon atoms, and $R^4$ is hydrogen or methyl.

* * * * *